Figure 1:
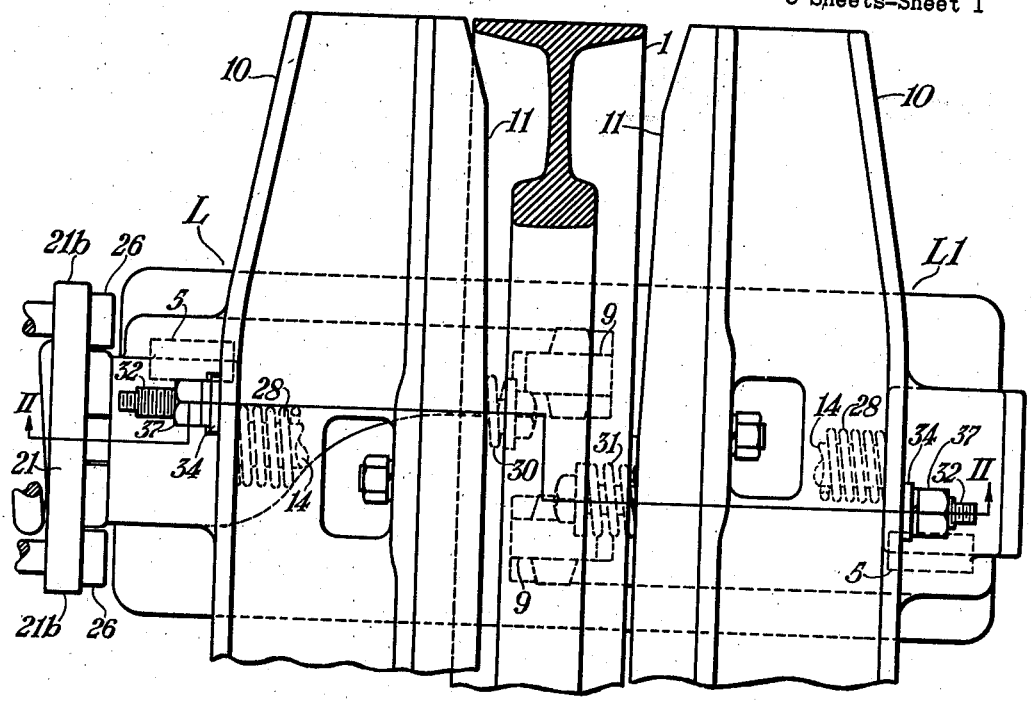

Feb. 17, 1942.   H. L. BONE   2,273,481
RAILWAY BRAKING APPARATUS
Filed Nov. 2, 1940   3 Sheets-Sheet 1

INVENTOR
Herbert L. Bone
BY
HIS ATTORNEY

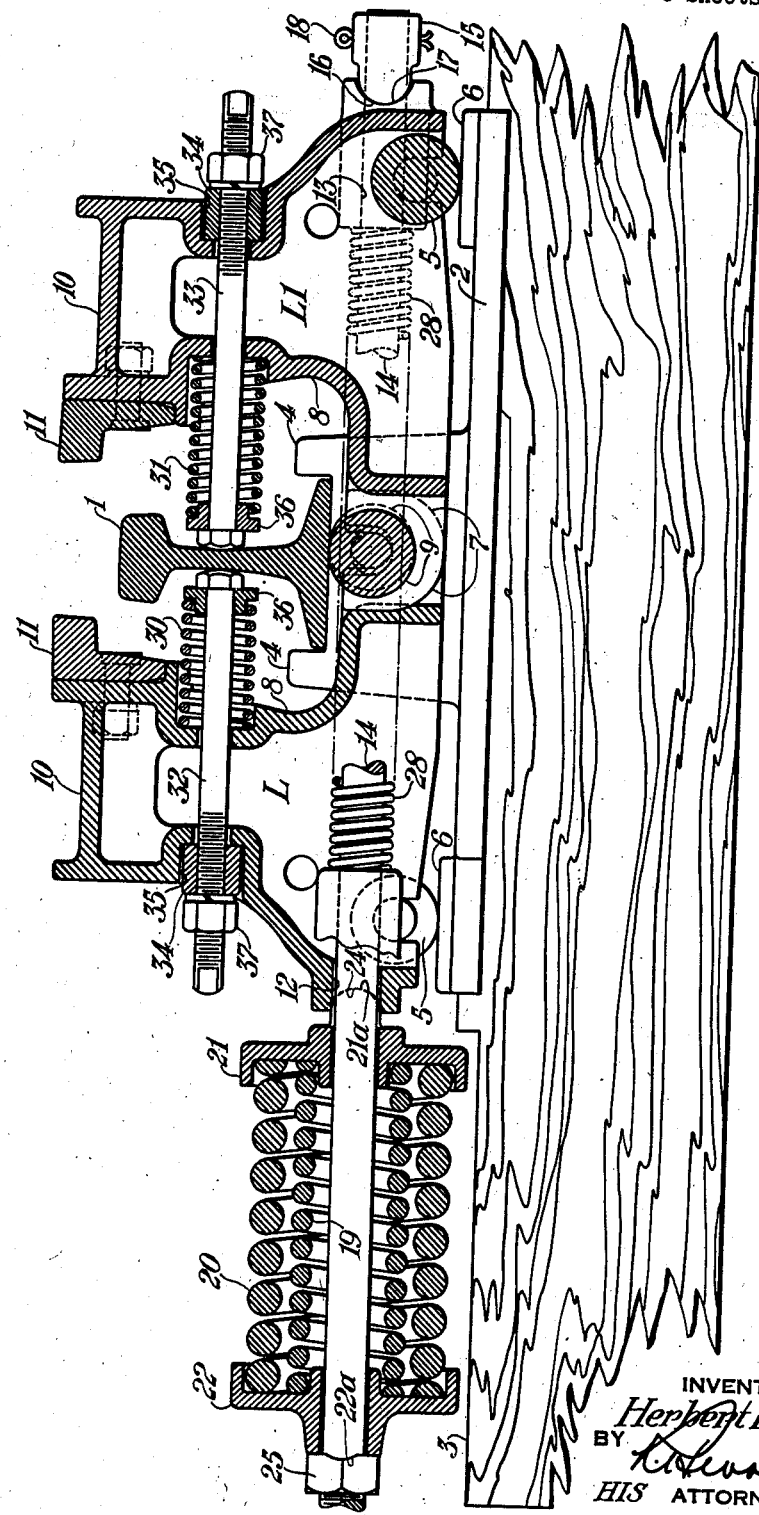

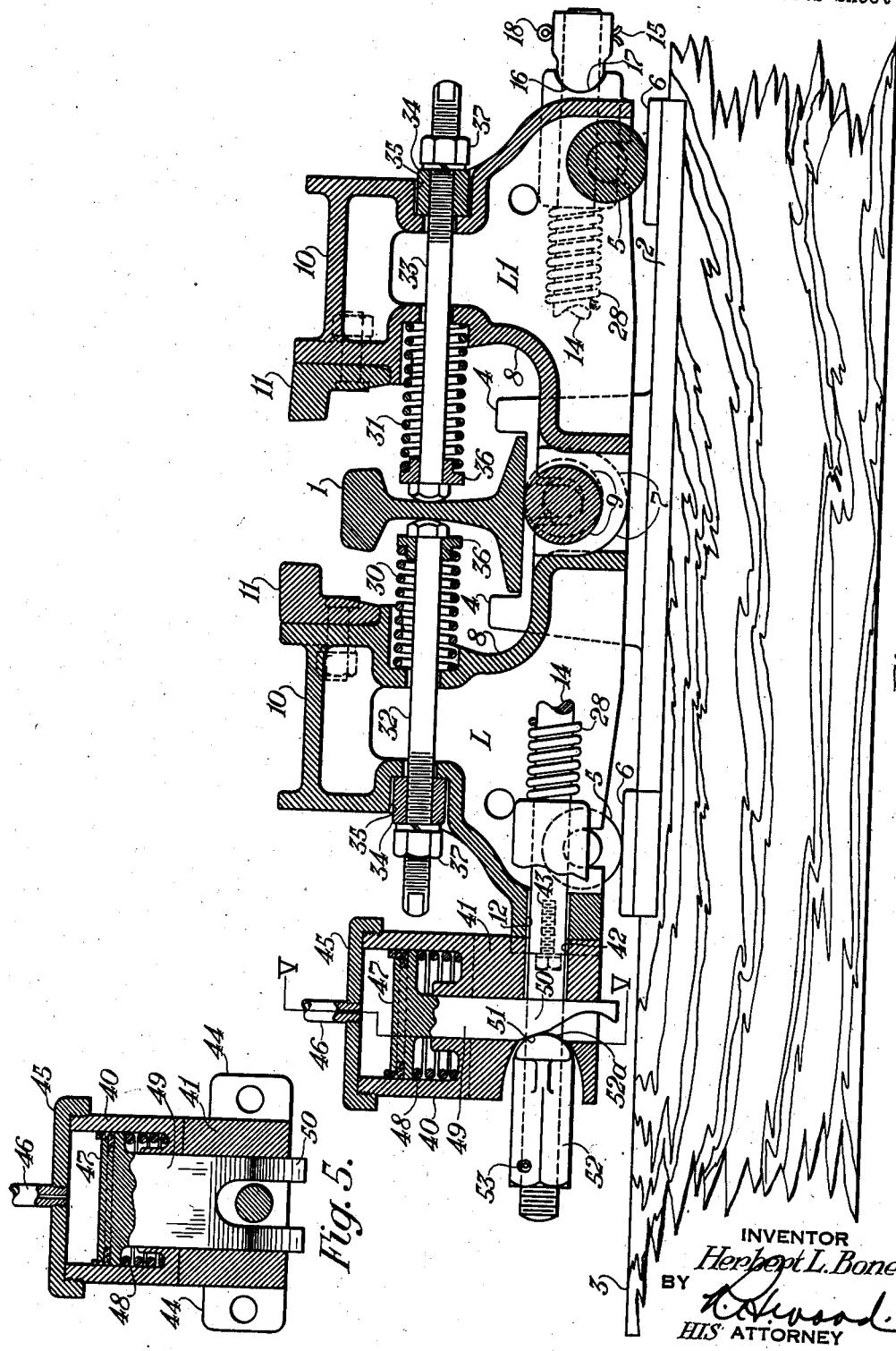

Patented Feb. 17, 1942

2,273,481

UNITED STATES PATENT OFFICE 2,273,481

RAILWAY BRAKING APPARATUS

Herbert L. Bone, Forest Hills, Pa., assignor to The Union Switch & Signal Company, Swissvale, Pa., a corporation of Pennsylvania Application November 2, 1940, Serial No. 364,044

14 Claims. (Cl. 188—62)

My invention relates to railway braking apparatus, and particularly to that class of braking apparatus known as car retarders. More particularly, my present invention relates to car retarders of the type in which the braking bars exert on each car an amount of retardation which is proportional to the weight of the car.

One object of my invention is to provide a car retarder of the type described in which no part of the weight of the car is transmitted to the retarder through the wheel flanges.

Another object of my invention is to provide a car retarder of the type described which can readily be adjusted.

A further object of my invention is to provide a car retarder of the type described in which a fixed amount of retardation is exerted on all cars above a predetermined weight, whereby excessive strains on the various parts of the apparatus are avoided.

A still further object of my invention is to provide a means for automatically rendering a car retarder of the type described ineffective to retard cars, which means shall be susceptible of either local or remote control.

According to the principal feature of my invention two levers are pivoted on opposite sides of a track rail which is free to move vertically, and are each provided with one arm which engages the underside of the track rail and another arm which extends upwardly along the side of the track rail and supports a braking bar for engagement with the sides of car wheels traversing the rail. The braking bars are normally spaced apart a distance which is less than the widths of car wheels and when a car enters the retarder the wheels force the braking bars apart, which causes the rail to rise vertically and hence causes the weight of the car to act through the levers to exert on the braking bars a force which is proportional to the weight of the car. The points about which the levers pivot are free to shift laterally relative to the rail to permit the braking bars to accommodate themselves to the different lateral positions the different car wheels assume relative to the rail, but are normally restrained from moving except in unison by spring or pneumatic means which, when a locomotive having wide wheels, or a car having a weight in excess of a predetermined weight traverses the rail, yields to prevent excessive strains from being exerted on the braking apparatus. When pneumatic means are provided, these means enable the retarder to be rendered effective or ineffective to retard cards according as these means are or are not supplied with fluid pressure.

Other objects and characteristic features of my invention will become apparent as the description proceeds.

The present invention is an improvement upon the invention disclosed and claimed in an application for Letters Patent of the United States, Serial No. 280,369, filed by Harold C. Clausen, on June 21, 1939, now Patent No. 2,238,772 of April 15, 1941, for Railway braking apparatus, and also upon that disclosed and claimed in Letters Patent of the United States No. 1,728,562, granted to Lars O. Grondahl, on September 17, 1929, for Car retarders.

The present application is a continuation-in-part of my application, Serial No. 355,573, filed September 6, 1940, now abandoned, for Railway braking apparatus.

Figure 3:
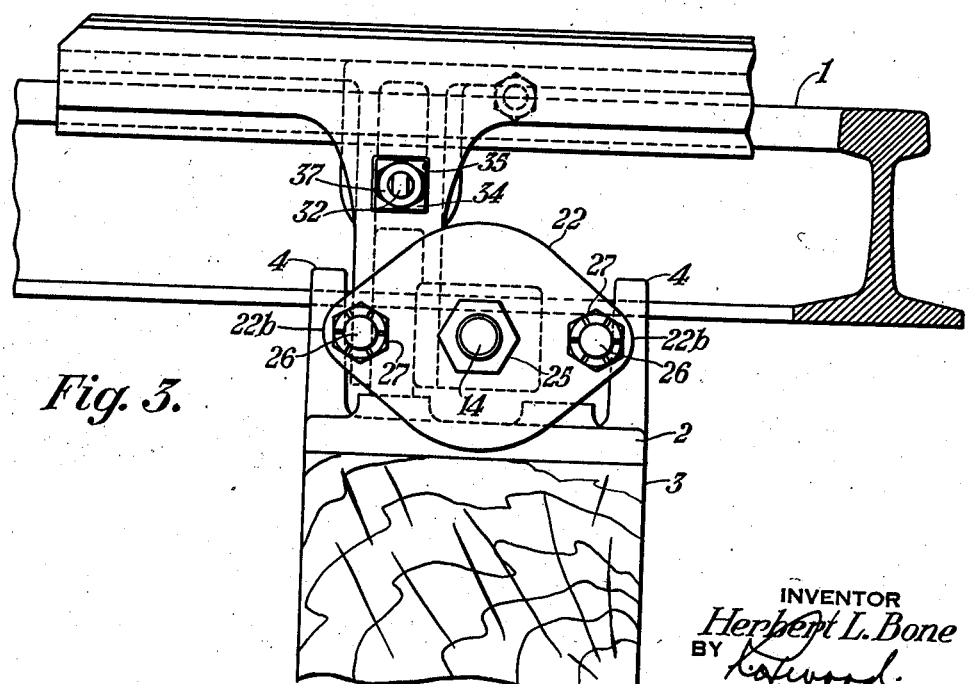

In the accompanying drawings, Fig. 1 is a top plan view showing one form of car retarder embodying my invention. Fig. 2 is a vertical sectional view taken substantially on the line II—II of Fig. 1. Fig. 3 is an end view of the retarder shown in Fig. 1, as it appears when viewed from the left in Fig. 1. Fig. 4 is a vertical sectional view similar to Fig. 2 showing a modified form of the retarder illustrated in the preceding views. Fig. 5 is a sectional view taken on the lines V—V of Fig. 2.

Similar reference characters refer to similar parts in all three views.

Referring to the drawings, the reference character 1 designates one track rail of a stretch of railway track over which the wheels of cars which are to be retarded by means of the braking apparatus embodying my invention are adapted to pass. The rail 1 normally rests on a support 2 mounted on a tie 3, but is adapted to at times be moved vertically upwardly to a position in which its base is out of engagement with the support 2, in a manner which will be made clear presently, when a car wheel traverses the rail, and for the purpose of permitting the necessary vertical movement without permitting lateral movement of the rail the base of the rail is disposed between laterally spaced vertical lugs 4 provided on the support 2. Tipping of the rail 1 is prevented by tie bars of well-known construction (not shown) which tie bars secure the rail 1 at spaced intervals to the opposite running rail, which latter is intended to be supported for limited vertical movement in a manner similar to the rail 1.

Disposed at spaced intervals along the rail 1 are a plurality of lever units, only one of which is shown in the drawings. Referring to the lever unit shown, this unit comprises two similar levers L and L1 pivotally supported on opposite sides of the rail by means of rollers 5 which ride on flat surfaces 6 provided on the support 2. The levers are substantially L-shaped, and each is provided with a horizontal arm 7 and with a vertical arm 8. The horizontal arm 7 of each lever extends underneath the rail and carries a roller 9 which engages the underside of the rail, while the vertical arm 8 of each lever terminates at its upper end in a brake bar 10 cast integrally with the lever. In the preferred form of my invention each brake bar is also cast integrally with the vertical arm of the corresponding lever of at least one adjacent unit, but it should be distinctly understood that my invention is not limited to this particular construction. Removably secured to each brake beam 10 is a brake shoe 11 disposed in a position to frictionally engage the adjacent side faces of car wheels traversing the rail 1.

Formed in the levers L and L1 at one side of the associated roller 5 a little above the axis of the roller are aligned openings 12 and 13, and extending with clearance through these openings is a spring bolt 14 one end of which is provided with a rocker nut 15 having rounded projections 16 disposed on opposite sides of the bolt and fitting into mating grooves 17 formed in the lever L1 adjacent the outer end of the opening 13. The nut 15 is arranged to be locked against rotation relative to the bolt by means of a cotter key 18.

The other end of the spring bolt 14 is provided with two concentric coil springs 19 and 20 disposed between inner and outer spring seats 21 and 22 slidably mounted on the bolt. The inner spring seat 21 bears against the lever L, and in order to hold it in a fixed angular position relative to the lever, it is provided on opposite sides of the bolt with horizontally aligned rounded bulges 21a which fit into horizontally aligned mating grooves 24 provided in the lever. The outer spring seat 22 engages a gauge adjusting nut 25 adjustably screwed onto the bolt 14, and this spring seat is provided on opposite sides of the bolt 14 with horizontally aligned rounded bulges 22a which cooperate with mating grooves formed in the inner face of the nut to lock the nut 25 in adjusted positions.

The spring seat 22 is further provided with diametrically opposite apertured lugs 21b which align with similar diametrically opposite lugs 22b provided on the spring seat 22, and each pair of aligned lugs receives a bolt 26 provided with a nut 27. The bolts 26 serve to adjust the initial tension of the springs 19 and 20 for a purpose which will appear hereinafter.

The levers are biased to the positions in which the lever L engages the inner spring seat 21, and the lever L1 engages the nut 15, by a spacing spring 28 disposed on the bolt 14 between the levers. This spring is weaker than the springs 19 and 20, and does not exert sufficient force on the levers to compress the springs 19 and 20 beyond their initial compression as determined by the adjustment of the bolts 26.

It will be apparent, therefore, that adjustment of the nut 25 will vary the spacing between the brake shoes 11, and this nut is so adjusted that the spacing between the brake shoes is less than the widths of the wheels of cars which are to be retarded by the braking apparatus. It will also be apparent that the nut 25 provides a means to compensate for brake shoe wear.

The lever unit illustrated also includes means for positioning the brake shoes laterally with respect to the rail when no car is traversing the rail 1 to facilitate the smooth entry of car wheels into the retarder. As here shown, these means comprise springs 30 and 31 mounted on spring bolts 32 and 33. The spring bolts extend through clearance holes in the levers and are provided adjacent their outer ends with non-circular nuts 34 which fit into non-circular recesses 35 in the levers in such manner that the nuts are prevented from rotating in response to rotation of the bolts, but that they are free to move outwardly in the recesses in the event the associated braking bar is moved closer to the rail than the position to which it is biased by the associated springs. The springs are disposed on the bolts between the inner sides of the vertical arms 8 and spring seats 36 which abut against the heads of the bolts, and serve to bias the bolts to the positions in which the heads of the bolts engage the web of the rail 1. To facilitate adjusting the bolts the outer ends of the bolts are flattened on two sides for the reception of a wrench or equivalent tool, and lock nuts 37 are provided to lock the bolts in their adjusted positions. The bolts are so adjusted that when the heads of the bolts are engaging the web of the rail and the nuts 34 are engaging the inner ends of the recesses 35 the levers will occupy the proper positions relative to the rail to cause a smooth entry of car wheels between the brake shoes.

With the retarder constructed in the manner described, when a car enters the retarder, the wheels of the car will force the brake shoes apart. This movement of the brake shoes will of course tend to cause the levers L and L1 to move laterally away from the rail and will also tend to cause the levers to pivot about the axes of the rollers 5. Lateral movement of the levers away from the rail, however, is resisted by the springs 19 and 20, and these springs are so adjusted that as long as the car weighs less than a predetermined weight, for example 70 tons, and has wheels of the usual widths, the movement of the levers due to the separation of the brake shoes will be limited to rotation about the axes of the rollers 5. Rotation of the levers about the axes of the rollers 5 will act through the rollers 9 to raise the rail 1 a distance which depends upon the original spacing between the brake shoes 11, as determined by the adjustment of the nut 25, and which distance is proportional to the width of the car wheels. The raising of the rail will lift the car with it, and it will be seen, therefore, that the car will then act through the rail to exert a force on the levers which urges the brake shoes into frictional engagement with the opposite side faces of the car wheels with a frictional force which is proportional to the weight of the car.

If the car weighs over the predetermined weight, the springs 19 and 20 will become compressed beyond their initial compression and will permit the levers to move apart, in which event the rail 1 will remain on the support 2. The same result would occur if a locomotive having wide wheels passed through the retarder. It follows that the principal reason for the springs 19 and 20 is to prevent overstressing the retarder in the event that exceptionally heavy cars or locomotives having exceptionally wide wheels go through it. These springs are also of a value to prevent one lever unit from taking more than its share of the load if a particular unit is adjusted much tighter than the adjacent ones.

It should be distinctly understood that the 70 ton limit mentioned hereinbefore is just an arbitrary limit, and that if the retarder were strong enough, the spring assembly including the springs 19 and 20 could be eliminated, in which event the nut 25 would be made to engage the lever L in place of the spring seat 21. If the spring unit including the springs 19 and 20 were eliminated, as suggested, then the braking pressure would be in proportion to the weight of the car for all cars regardless of their weight.

If it is desired to render the retarder ineffective to retard cars for any reason, this result can be accomplished by backing off either nut 25 or nut 15 a sufficient amount.

It should be noted that while the spring unit including the springs 19 and 20 is normally effective to limit movement of the levers to rotation about the axes of the rollers 5, the levers are free to move in unison laterally with respect to the rail to permit the brake shoes to adjust themselves to car wheels having the usual range of variation in widths and engaging the rail in different lateral positions due for example to flange wear or the like.

It should also be noted that when the brake shoes become worn, and the nut 25 is adjusted to compensate for their wear, it will be necessary to readjust the centering spring units including the springs 30 and 31.

In actual practice the centering spring units including the springs 30 and 31 will usually only be necessary on the lever units at the two ends of the retarder, and may be omitted from the other units.

Referring now to Fig. 4, in the modified form of the retarder here illustrated fluid pressure means are provided in place of the spring unit including the springs 19 and 20, whereby the retarder can readily be rendered effective or ineffective to retard cars either from a local or from a remote point. These fluid pressure means, as here shown, comprise a fluid pressure cylinder 40 formed integrally with a combined cam guide and mounting bracket 41. The combined cam guide and mounting bracket is provided with a through hole 42 which receives the spring bolt 14 with some clearance, and is secured to the lever L on opposite sides of the spring bolt by means of mounting bolts 43 which extend through laterally spaced apertured lugs 44 provided on the bracket and are screwed into tapped holes formed in the lever. The cylinder 40 is closed at its upper end by a cylinder head 45, and is arranged to be at times supplied with fluid pressure through a pipe 46 which is screwed into a suitable opening provided in the cylinder head 45. Mounted in the cylinder 40 is a reciprocable piston 47 which is biased to a retracted position by means of a compressed coil spring 48. The piston 47 drives a piston rod 49, the lower end of which is formed with an integral bifurcated cam 50 which straddles the spring rod 14. The cam 50 is formed on the side farthest away from the lever L with inclined cam surfaces 51, and these cam surfaces cooperate with horizontally aligned rounded bulges 52a provided on a gauge adjusting nut 52 screwed onto the outer end of the spring bolt 14. The nut 52 is arranged to be locked in an adjusted position by means of a cotter key 53. The portion of the retarder not specifically described is identical with the corresponding portion of the retarder shown in Figs. 1, 2 and 3.

With the retarder constructed in the manner shown in Fig. 4, it will be apparent that the spring 28 will constantly urge the levers L and L1 apart to the positions in which the gauge adjusting nut 52 engages the cam surfaces 51 on the cam 50. The nut 52 is so adjusted, and the parts are so proportioned, that when the piston 47 occupies its projected position in which it is shown in the drawings, the levers L and L1 will be moved toward each other to positions in which the spacing between the brake shoes 11 is less than the widths of car wheels, but that, when the piston occupies its retracted position, the levers will then be separated to inactive positions in which the brake shoes will just clear vehicle wheels passing through the retarder. The parts are further so proportioned that when air is admitted to cylinder 40 to move the piston 47 to its projected position, the force exerted by the piston on the cam 50 will be sufficient to limit movement of the levers to rotation about the axes of the rollers 5 for all vehicles having a weight less than a predetermined weight, for example 70 tons, but that, if a vehicle having a weight in excess of this predetermined weight traverses the retarder, the reaction will force the piston upwardly a sufficient amount to prevent damage to the apparatus. The reaction force necessary to cause the piston to move upwardly depends in part on the slope of the cam surface 51, and this slope may be varied in the manner shown so that after the piston has once started to move upwardly the force required to complete the movement will decrease. The parts are still further so proportioned that when air is exhausted from the cylinder 40, the spring 48 will move the piston 47 to its upper position and permit the spring 28 to move the braking bars to their inactive positions.

It will be seen, therefore, that with the retarder constructed as shown in Fig. 4, when air is admitted to the cylinder 40, the retarder will function in essentially the same manner as when the retarder is constructed in the manner shown in Figs. 1, 2 and 3. When, however, air is exhausted from the cylinder 40, the spring 28 will move the levers to their inactive positions, and the retarder will then be ineffective to retard vehicles.

The supply of fluid pressure to the cylinder 40 may be controlled either from a local or a remote point in accordance with well-known practice. One method which may be used for controlling the supply of fluid pressure to the cylinder 40 is shown and described in my prior Patent No. 2,129,301, granted September 6, 1938, for Railway braking apparatus.

Although I have herein shown and described only two forms of railway braking apparatus embodying my invention, it is understood that various changes and modifications may be made therein within the scope of the appended claims without departing from the spirit and scope of my invention.

Having thus described my invention, what I claim is:

1. The combination with a vertically movable track rail, of two levers pivotally supported on opposite sides of said rail and each having one arm engaging the underside of the rail and another arm extending upwardly and carrying means for frictionally engaging the wheels of a car traversing said rail, said wheel engaging means being spaced apart when no car is traversing the rail a distance which is less than the widths of car wheels, whereby when a car is traversing the rail the wheels of the car will rotate the levers in directions to raise the rail and will thus cause the car to exert on the levers a force which is proportional to the weight of the car, and the axes about which the levers pivot being free to move laterally relative to the rail to permit the levers to adjust themselves to the positions and sizes of the car wheels.

2. The combination with a vertically movable track rail, of two levers pivotally supported on opposite sides of said rail and each having one arm engaging the underside of the rail and another arm extending upwardly and carrying means for frictionally engaging the wheels of a car traversing said rail, said wheel engaging means being spaced apart when no car is traversing the rail a distance which is less than the widths of car wheels, whereby when a car is traversing the rail the wheels of the car will rotate the levers in directions to raise the rail and will thus cause the car to exert on the levers a force which is proportional to the weight of the car, the axes about which the levers pivot being free to move laterally relative to the rail to permit the levers to adjust themselves to the position and size of the car wheels, and means for normally causing the axes about which the levers pivot to occupy predetermined positions relative to the rail.

3. The combination with a vertically movable track rail, of two levers pivotally supported on opposite sides of said rail on pivots which are free to move laterally toward or away from the rail and each having one arm engaging the underside of the rail and another arm extending upwardly and carrying means for frictionally engaging the wheels of a car traversing said rail, and means normally biasing the levers to positions in which the wheel engaging means are spaced apart a distance which is less than the widths of car wheels in such manner that the levers are free to move laterally relative to the rail as a unit and are also free to rotate about the axes of their pivots but that lateral movement of the levers relative to one another is permitted only in response to an abnormal force exerted on the levers, whereby when a car traverses the rail the movement of the levers due to the engagement of the wheels with the wheel engaging means will cause the wheel engaging means to exert on car wheels a frictional braking force which is proportional to the weight of the car.

4. The combination with a vertically movable track rail, of two levers pivotally supported on opposite sides of said rail on pivots which are free to move laterally toward or away from the rail and each having one arm engaging the underside of the rail and another arm extending upwardly and carrying means for frictionally engaging the wheels of a car traversing said rail, means normally biasing the levers to positions in which the wheel engaging means are spaced apart a distance which is less than the widths of car wheels in such manner that the levers are free to move laterally relative to the rail as a unit and are also free to rotate about the axes of their pivots but that lateral movement of the levers relative to one another is permitted only in response to an abnormal force exerted on the levers, whereby when a car traverses the rail the movement of the levers due to the engagement of the wheels with the wheel engaging means will cause the wheel engaging means to exert on car wheels a frictional force which is proportional to the weight of the car, and means for positioning the levers laterally relative to the rail when no car is traversing the rail.

5. The combination with a vertically movable track rail, of two levers pivoted on opposite sides of the rail and each having one arm engaging the underside of the rail and another arm extending upwardly at one side of the rail and carrying a brake shoe for frictionally engaging the wheels of a car traversing said rail, and means for adjusting the spacing between said pivots to vary the spacing between said wheel engaging means while permitting lateral movement of the pivots to permit the wheel engaging means to adjust themselves to the position relative to the rail of a car wheel traversing the rail.

6. The combination with a vertically movable track rail, of two levers pivoted on opposite sides of the rail on pivots mounted for lateral movement relative to the rail, each said lever being provided with one arm carrying a brake shoe for frictionally engaging the wheels of a car traversing the rail and another arm engaging the underside of the rail and effective in response to rotation of the lever due to engagement of the brake shoe with car wheels to move said rail vertically upwardly, whereby said brake shoes will exert on the wheels of a car traversing said rail a frictional force which is proportional to the weight of the car, and means for limiting relative lateral movement of said pivots while permitting lateral movements of said pivots in unison to permit the brake shoes to adjust themselves to the different lateral positions different car wheels traversing the rail assume relative to the rail.

7. In an inert car retarder of the weight responsive type in which pivoted levers are disposed on opposite sides of the rail and are at times effective when a car traverses the rail to lift the rail and car to cause the levers to engage the car with a force which is proportional to the weight of the car, the combination of pivots for the levers which are free to move laterally relative to the rail, and means for preventing lateral movement of the pivots relative to one another for cars having a weight less than a predetermined weight while permitting lateral movement of the pivots in unison relative to the rail.

8. In an inert car retarder of the weight responsive type in which pivoted levers are disposed on opposite sides of the rail and are at times effective when a car traverses the rail to lift the rail and car to cause the levers to engage the car with a force which is proportional to the weight of the car, the combination of pivots for the levers which are free to move laterally relative to the rail, and fluid pressure means for preventing lateral movement of the pivots relative to one another for cars having a weight less than a predetermined weight while permitting lateral movement of the pivots in unison relative to the rail.

9. In an inert car retarder of the weight responsive type in which pivoted levers are disposed on opposite sides of the rail and are at times effective when a car traverses the rail to lift the rail and car to cause the levers to engage the car with a force which is proportional to the weight of the car, the combination of pivots for the levers which are free to move laterally relative to the rail, and means including a fluid pressure motor secured to one of the levers and a cam operated by the motor for at times preventing and at other times permitting lateral movements of the pivots relative to one another.

10. In an inert car retarder of the weight responsive type in which pivoted levers are disposed on opposite sides of the rail and are at times effective when a car traverses the rail to lift the rail and car to cause the levers to engage the car with a force which is proportional to the weight of the car, the combination of pivots for the levers which are free to move laterally relative to the rail, and means including a fluid pressure motor secured to one of the levers and a cam operated by the motor for preventing lateral movements of the pivots for all cars having a weight less than a predetermined weight when the motor is supplied with fluid pressure while permitting lateral movements of the pivots for all cars having a weight in excess of said predetermined weight.

11. The combination with a vertically movable track rail, of two levers pivotally supported on opposite sides of said rail on pivots which are free to move laterally toward or away from said rail and each having one arm engaging the underside of the rail and another arm extending upwardly and carrying means for frictionally engaging the wheels of a car traversing said rail, aligned holes provided in the levers, a bolt extending with clearance through said aligned holes, and means including said bolt for normally biasing the levers to positions in which the wheel engaging means are spaced apart a distance which is less than the widths of car wheels in such manner that the levers are free to move laterally relative to the rail as a unit and are also free to rotate about the axes of their pivots but that lateral movement of the levers relative to one another is permitted only in response to an abnormal force exerted on the levers, whereby when a car traverses the rail the movement of the levers due to the engagement of the wheels with the wheel engaging means will cause the wheel engaging means to exert on car wheels a frictional braking force which is proportional to the weight of the car.

12. The combination with a vertically movable track rail, of two levers pivotally supported on opposite sides of said rail on pivots which are free to move laterally toward or away from the rail and each having one arm engaging the underside of the rail and another arm extending upwardly and carrying means for frictionally engaging the wheels of a car traversing said rail, and means including a bolt extending through clearance holes in the levers and spring means mounted on the bolt for normally biasing the levers to positions in which the wheel engaging means are spaced apart a distance which is less than the widths of car wheels in such manner that the levers are free to move laterally relative to the rail as a unit and are also free to rotate about the axes of their pivots but that lateral movement of the levers relative to one another is permitted only in response to an abnormal force exerted on the levers, whereby when a car traverses the rail the movement of the levers due to the engagement of the wheels with the wheel engaging means will cause the wheel engaging means to exert on car wheels a frictional braking force which is proportional to the weight of the car.

13. The combination with a vertically movable track rail, of two levers pivotally supported on opposite sides of said rail on pivots which are free to move laterally toward or away from said rail and each having one arm engaging the underside of the rail and another arm extending upwardly and carrying means for frictionally engaging the wheels of a car traversing said rail, aligned holes provided in the levers, a bolt extending with clearance through said aligned holes, a fluid pressure cylinder secured to one lever and containing a piston biased to a retracted position, a bifurcated cam operatively connected with said piston and straddling said bolt, nuts on each end of said bolt and one cooperating with an inclined cam face formed on said cam, and a spring on said bolt between said levers effective to bias the levers apart to positions in which said one nut engages the cam face of said cam, said nuts being so adjusted and the parts being so proportioned that when fluid pressure is supplied to said motor said piston will move to its projected position and will act through said cam and said one nut to move said braking bars to positions in which the spacing between said wheel engaging means is less than the widths of car wheels but that when said motor is connected with atmosphere said piston will move to its retracted position due to its bias and will permit said spring to move said levers apart to positions in which said wheel engaging means will remain out of engagement with vehicle wheels traversing said track rail.

14. The combination with a vertically movable track rail, of two levers pivotally supported on opposite sides of said rail on pivots which are free to move laterally toward or away from said rail and each having one arm engaging the underside of the rail and another arm extending upwardly and carrying means for frictionally engaging the wheels of a car traversing said rail, aligned holes provided in the levers, a bolt extending with clearance through said aligned holes, a fluid pressure cylinder secured to one lever and containing a piston biased to a retracted position, a bifurcated cam operatively connected with said piston and straddling said bolt, nuts on each end of said bolt and one cooperating with an inclined cam face formed on said cam, and a spring on said bolt between said levers effective to bias the levers apart to positions in which said one nut engages the cam face of said cam, said nuts being so adjusted and the parts being so proportioned that when fluid pressure is supplied to said motor said piston will move to its projected position and will act through said cam and said one nut to move said braking bars to positions in which the spacing between said wheel engaging means is less than the widths of car wheels but that when said motor is connected with atmosphere said piston will move to its retracted position due to its bias and will permit said spring to move said levers apart to positions in which said wheel engaging means will remain out of engagement with vehicle wheels traversing said track rail, the parts being further so proportioned that when said motor is supplied with fluid pressure and a vehicle traverses the rail the movements of the levers due to the engagement of the wheels with the wheel engaging means will cause the levers to rotate about their pivots for all vehicles under a predetermined weight and will thus cause the wheel engaging means to exert on vehicle wheels a frictional force which is proportional to the weight of the vehicle but that for all vehicles over said predetermined weight said piston will move toward its retracted position and permit the levers to separate to avoid excessive strains on the braking apparatus.

HERBERT L. BONE.